Feb. 3, 1959 B. H. HEFNER 2,872,141
CABLE HANGER
Filed Nov. 27, 1953
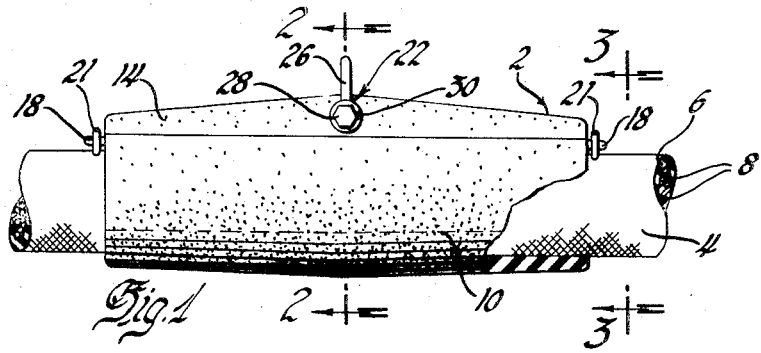
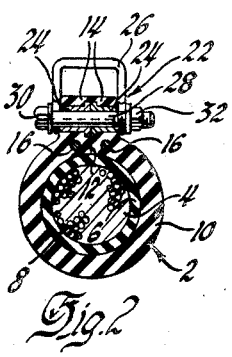
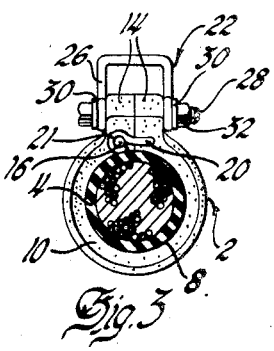
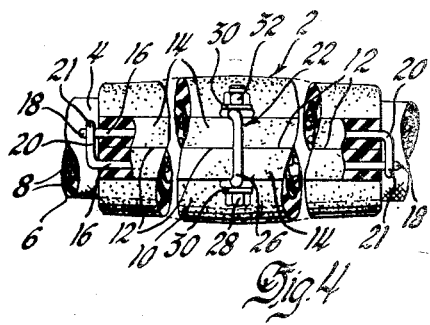
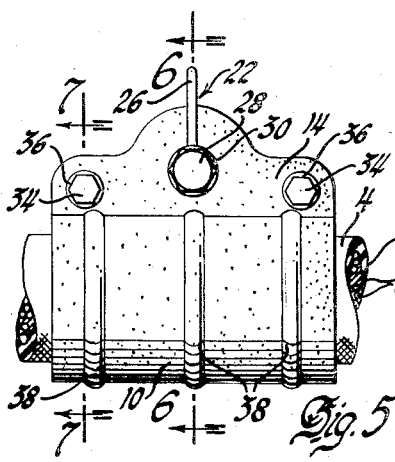
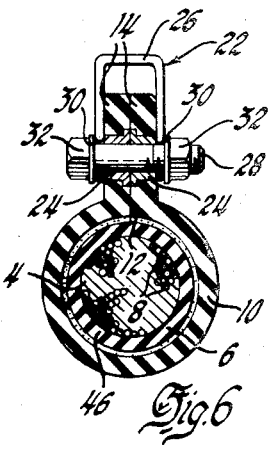
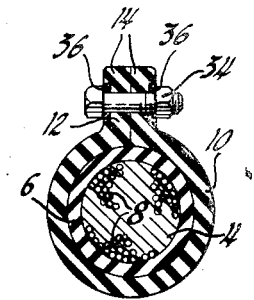
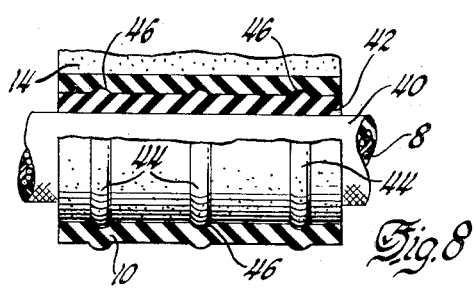
INVENTOR
Bert H. Hefner
BY
S. C. Thorpe
ATTORNEY

United States Patent Office 2,872,141
Patented Feb. 3, 1959

2,872,141

CABLE HANGER

Bert H. Hefner, Western Springs, Ill., assignor to General Motors Corporation, Detroit, Mich., a corporation of Delaware Application November 27, 1953, Serial No. 394,582

6 Claims. (Cl. 248—62)

The present invention generally relates to means for suspending electrical cable and is more particularly concerned with the problem of suspending jumper cables extending between the locomotive units of a locomotive consist. It will be understood as the description proceeds, however, that the invention is not limited to Diesel electric locomotives only, but has a much wider field of application.

In order to understand the primary purpose of this invention, it should be appreciated that the jumper cabling used between locomotive units is usually rather heavy because of a large number of wire jumper pairs that are needed to operate the various controls in each locomotive unit. It should also be appreciated that the lengths of cable used between locomotive units are relatively short because of the close proximity of the locomotive units. Furthermore, because of the motion of the locomotive units due to rough track, curves, etc., the cable is subjected to a substantial amount of flexing movement. This uncontrolled flexing of short lengths of heavy cable has created serious problems in the suspension of the cable. For example, if the cable is suspended by rigidly clamping it at a narrow section, the constant flexing of the cable soon tears it apart adjacent the spot where clamping occurs. On the other hand, if the cable is not sufficiently supported intermediate its receptacle and plug ends it begins to move in a rather violent manner due to the inertia and other forces exerted by the motion of the locomotive units and this violent motion soon wears out the receptacle and plug connections.

It is therefore an object of the present invention to provide an electrical cable hanger for relatively short length cable sections which will yieldably hold the cable therein, the hanger having a certain amount of flexibility to relieve sharp flexing junctures between cable and hanger; the hanger, however, having sufficient stiffness to prevent setting up an uncontrolled movement of the cable which tends to increase the wear at the receptacle and plug ends thereof.

It is a further object of this invention to provide a cable hanger for relatively short length cable sections which will accomplish the above object and is easy to apply and quickly secured.

For other objects and a better understanding of this invention reference may be had to the following detailed description and the drawings, in which:

Fig. 1 is an exterior view in elevation of the new cable hanger with a portion of cable extending therethrough;

Fig. 2 is a transverse section of the cable hanger and cable taken on the line 2—2 of Fig. 1 to illustrate the combination center securing and hanging means;

Fig. 3 is an end view in elevation of the cable hanger taken on the line 3—3 of Fig. 1 to illustrate the quick interlocking feature of the reinforcing members which maintain the ends of the hanger together to generally increase the support of the cable;

Fig. 4 is a top view of the cable hanger with parts broken away and serves as a further illustration of the novel reinforcing and interlocking means;

Fig. 5 is a modification of the new cable hanger illustrating the use of annular reinforcing ribs which tend to sustain the form of the hanger and still give it the necessary flexibility;

Fig. 6 is a section taken on the line 6—6 of Fig. 5 and also illustrates the center securing means for the cable hanger;

Fig. 7 is a view taken on line 7—7 of Fig. 5 to illustrate the manner in which the lip ends of the modified cable hanger are secured together;

Fig. 8 shows how the cable hanger of Fig. 5 may be adapted for different sizes of cable.

Referring first to Figs. 1 through 4, a cable hanger indicated generally by the numeral 2 is shown supporting a length of cable 4. The cable 4 includes the usual rubber or other type of insulating cover 6 enclosing a plurality of jumper pairs 8.

The cable hanger 2 is preferably molded of some good resilient insulating material and comprises a resilient jacket including a tubular body portion 10 longitudinally split along its upper side as at 12 and a pair of cooperating lips 14 extending along and further defining the split 12.

It will be noted that the lips 14 are relatively deep at the center portions thereof and gradually taper down to lesser depths at the ends thereof. This has been done to provide the cable hanger with its greater stiffness at the center thereof and to gradually reduce the stiffness towards the ends of the cable hanger so as to give it the required flexibility and enable the cable hanger to form the same arc formed by the flexible conductor included therein.

Extending longitudinally through the base portions of the lips 14 are reinforcing bars or wires 16 each of which is provided with a straight end 18 and a bent end 20 having an eyelet 21 formed therein. These reinforcing members 16 are imbedded and secured in the lips 14 so that oppositely projecting ends 18 and 20 may be interlocked when the lips 14 are placed together in mating relation. To prevent unlocking of the ends 18 and 20 and to further secure lips 14 intermediate the ends thereof, a combination hanging and securing means 22 has been provided. The means 22 includes a pair of flanged bushings 24 assembled in countersunk holes provided in the lips 14 intermediate the ends thereof and a U-shaped ring 26 for suspending the cable hanger from a suitable support. The ring 26 is provided with eyelets at the ends thereof which may be placed over the lips 14 to engage opposite ends of the bushings 24. The entire assembly is then fastened to secure lips 14 together intermediate the ends thereof by a bolt 28, washers 30 and a nut 32.

It will be observed that the bushings 24, which are preferably made of brass, are provided with engaging flanges which prevent axial movement of the bushings relative to the lips 14. It will also be observed that the bushings 24 extend completely through lips 14 and are engage between the eye-ends of ring 26 so that inadvertent overtightening of the bolt and nut assembly 28—32 will not cut or shear the lips 14 to destroy the effectiveness of the intermediate securing means 22.

To assembly the cable hanger about the cable 4, the lips 14 are sufficiently separated and due to the resiliency of the material used the hanger may be pushed over the cable much in the manner of a clip. Because of the flexibility of the material used, once the cable 4 is in the body portion 10 the interlocking ends 18 and 20 may be secured together by first moving the lips 14 in generally longitudinal opposite directions until the ends 18 are aligned with the eyelets 21 in the ends 20 and then reversing longitudinal movement of the lips until the ends 18 are engaged in eyelets 21. Once the interlocking ends of the reinforcing members 16 are secured together, the lips 14 may be secured against further longitudinal movement relative to each other by the combination hanging and securing means 22.

It will be appreciated that this reinforcing means then serves two purposes. First, in combination with lips 14 it aids in establishing the proper stiffness or flexibility of the cable hanger. Secondly, it provides a simple yet extremely effective means for securing the ends of the cable hanger about the cable, a feature which is extremely important in establishing the proper flexibility of the hanger at its ends. The quick fastening and unfastening feature of the cable hanger also becomes very important where the cable hanger is used between locomotive units and it is desired to quickly couple or uncouple these units.

A modified form of cable hanger is shown in Figs. 5 through 8 and includes a molded insulated jacket supporting the cable 4 and comprising the same body portion 10 and lips 14. The lips 14 are secured together intermediate their ends by the same hanging and securing means 22 shown in the cable hanger in Figs. 1 through 4 and includes the brass bushings 24, the ring 26, bolt 28, washers 30 and nut 32. The ends of the lips 14 of the cable hanger as shown in Figs. 5 through 8 are secured by means of small bolt assemblies 34 and small washers 36, preferably of brass, set in the ends thereof. The body portion 10 is reinforced by means of ribs 38, any number of which may be added and spaced to give the requisite stiffness or flexibility. The larger the number of ribs the more uniform the bending and the less the distortion of the flexible cable hanger.

The cable hanger shown in Figs. 5 through 8 also has its greatest amount of stiffness at the center portions thereof, with its stiffness gradually becoming less toward the ends thereof by reason of its lips 14.

Fig. 8 shows a cable 40 which is substantially smaller in diameter than the diameter of cable 4. To accommodate this smaller diameter cable in the cable hanger, an adapter 42 comprising a longitudinally split tubular member is provided with outer reinforcing and retaining ribs 44. These ribs are engageable in recesses 46 provided in the inner surface of the tubular body 10 and prevent longitudinal movement of the member 42 relative to the body portion 10.

I claim:

1. In an electrical cable hanger means for yieldably suspending flexible electrical cable therein, comprising a jacket of resilient material, said jacket including a longitudinally extending cable carrying tubular member split along its length and outwardly extended longitudinal lips on said member coextensive with each side of said split, interlocking means projecting longitudinally from the ends of said lips securable by movement of said lips in generally longitudinal opposite directions comprising mating eyes and pins, and means intermediate the ends of said lips to secure said lips against longitudinal movement relative to each other, said lips being of maximum cross sectional area at the centers thereof and gradually decreasing in cross section to a minimum at the ends thereof to gradually vary the stiffness of said jacket from a maximum at the center of said jacket to a minimum at the ends thereof whereby said cable may be flexibly supported in a substantially uniform arc for a material portion of its length.

2. A cable hanger for suspending electrical cables comprising a jacket molded of resilient material, said jacket including a tubular body portion split along its length and an outwardly extended longitudinal lip on said body portion coextensive with each side of said split, means to secure said lips together at the ends thereof, and means intermediate the ends of said lips for securing said lips together to prevent distortion and destruction of said lips when secured together including bushings extending through each of said lips intermediate the ends thereof, each of said bushings having a flanged end in a countersunk recess in one of said lips, a suspending loop for connecting the hanger to a support having ends thereon in engagement with the ends of said bushings remote from said flanged ends and securing means engaging said loop ends and extending through said bushings to clamp the flanged ends of said bushings together and said loop ends to the ends of said bushings to prevent said securing means from coming in intimate contact with said lips.

3. An electrical cable hanger for accommodating electrical cables having different diameters comprising a jacket molded of resilient material said jacket including a tubular body portion split along its length and an outwardly extended longitudinal lip coextensive with each side of said split, said body portion having annular grooves formed in the inner surface thereof, an adapter including a second longitudinally split tubular body portion having annular ribs in its outer surface which cooperate with said inner grooves to prevent longitudinal movement of said adapter relative to said body portion, and securing means at the ends and intermediate the ends of said lips, means to secure said lips together at the ends thereof, and means intermediate the ends of said lips for securing said lips together to prevent distortion and destruction of said lips when secured together including bushings extending through each of said lips intermediate the ends thereof, each of said bushings having a flanged end in a countersunk recess in one of said lips, a suspending loop for connecting the hanger to a support having ends thereon in engagement with the ends of said bushings remote from said flanged ends and securing means engaging said loop ends and extending through said bushings to clamp the flanged ends of said bushings together and said loop ends to the ends of said bushings to prevent said securing means from coming in intimate contact with said lips.

4. An electrical cable hanger comprising a cable carrying tubular member split along its length and outwardly extended longitudinal lip on said body portion coextensive with each side of said split, longitudinally extending reinforcing means imbedded in said lips and projecting from the ends thereof, said reinforcing means having interlocking end portions securable by movement of said lips in generally longitudinal opposite directions relative to each other, and means intermediate the ends of said lips to secure said lips against longitudinal movement relative to each other.

5. In an electrical cable hanger, means for suspending short lengths of heavy electrical cable extending between coupled vehicle units so that said cable may be flexed in natural arcs varying in accordance with the variable movement of said units, comprising a jacket of resilient material, said jacket including a cable carrying tubular member split along its length and an outwardly extending longitudinal lip on said member coextensive with each side of said split, longitudinally extending reinforcing means imbedded in said lips and projecting from the ends thereof, said reinforcing means having interlocking end portions securable by movement of said lips in generally longitudinal opposite directions, and means intermediate the ends of said lips to secure said lips against longitudinal movement relative to each other, said lips being of maximum cross section at the center thereof and gradually decreasing in cross section to a minimum at the ends thereof to gradually vary the stiffness of said jacket from a maximum at the center of said jacket to a minimum at the ends thereof whereby said jacket will resistively be flexed with and support said cable in substantially uniform arcs for a material portion of its length.

6. A cable hanger for suspending electrical cables having different diameters comprising a jacket molded of resilient material, said jacket including a tubular body portion split along its length and an outwardly extended longitudinal lip on said body coextensive with each side of said split, an adapter including a second tubular body portion split along its length and inserted in said first tubular member, means to secure said lips together at the ends thereof, and means intermediate the ends of said lips for securing said lips together to prevent distortion and destruction of said lips when secured together including bushings extending through each of said lips intermediate the ends thereof, each of said bushings having a flanged end in a countersunk recess in one of said lips, a suspending loop for connecting the hanger to a support having ends thereon in engagement with the ends of said bushings remote from said flanged ends and securing means engaging said loop ends and extending through said bushings to clamp the flanged ends of said bushings together and said loop ends to the ends of said bushings to prevent said securing means from coming in intimate contact with said lips.

References Cited in the file of this patent

UNITED STATES PATENTS

| | | |
|---|---|---|
| 1,794,278 | Carney | Feb. 24, 1931 |
| 1,898,677 | Malone | Feb. 21, 1933 |
| 1,916,937 | Schlaburg | July 4, 1933 |
| 1,988,435 | Beebe | Jan. 22, 1935 |
| 2,073,338 | Durkee | March 9, 1937 |
| 2,227,528 | Adler | Jan. 7, 1941 |
| 2,408,253 | Diebold | Sept. 24, 1946 |
| 2,609,003 | Kass | Sept. 2, 1952 |
| 2,625,263 | Kice | Jan. 13, 1953 |
| 2,722,393 | Peterson | Nov. 1, 1955 |

FOREIGN PATENTS

| | | |
|---|---|---|
| 505,013 | Great Britain | May 1, 1919 |